United States Patent [19]

Dennison

[11] 4,141,479

[45] Feb. 27, 1979

[54] LEADER DISPENSER

[75] Inventor: Robert R. Dennison, Portland, Oreg.

[73] Assignee: Weiss Scientific Glass Blowing, Inc., Portland, Oreg.

[21] Appl. No.: 876,471

[22] Filed: Feb. 9, 1978

[51] Int. Cl.² ............................................. B65H 35/10
[52] U.S. Cl. ........................................ 225/38; 225/82; 225/90; 242/137.1
[58] Field of Search ...................... 242/134, 137, 137.1, 242/146, 118.4; 225/43, 45–48, 90, 50, 51, 33–38, 82; 43/54.5 R

[56] References Cited

U.S. PATENT DOCUMENTS

| | | | |
|---|---|---|---|
| 2,340,184 | 1/1944 | Gray | 225/33 |
| 2,630,981 | 3/1953 | Strocco | 242/137.1 X |
| 4,026,063 | 5/1977 | Allen et al. | 43/54.5 R |
| 4,050,648 | 9/1977 | Tisma | 242/137.1 |

Primary Examiner—Leonard D. Christian
Attorney, Agent, or Firm—Kolisch, Hartwell, Dickinson & Stuart

[57] ABSTRACT

A leader dispenser having separable top and bottom sections housing multiple spools of leader therein. Multiple spool mounting posts provided within each section for rotatably mounting the spools are dimensioned to frictionally engage the spools, preventing the spools from freely unwinding. The spools in the dispenser form two tiers, with end faces of the spools in the bottom housing section facing end faces of the spools in the top housing section.

7 Claims, 6 Drawing Figures

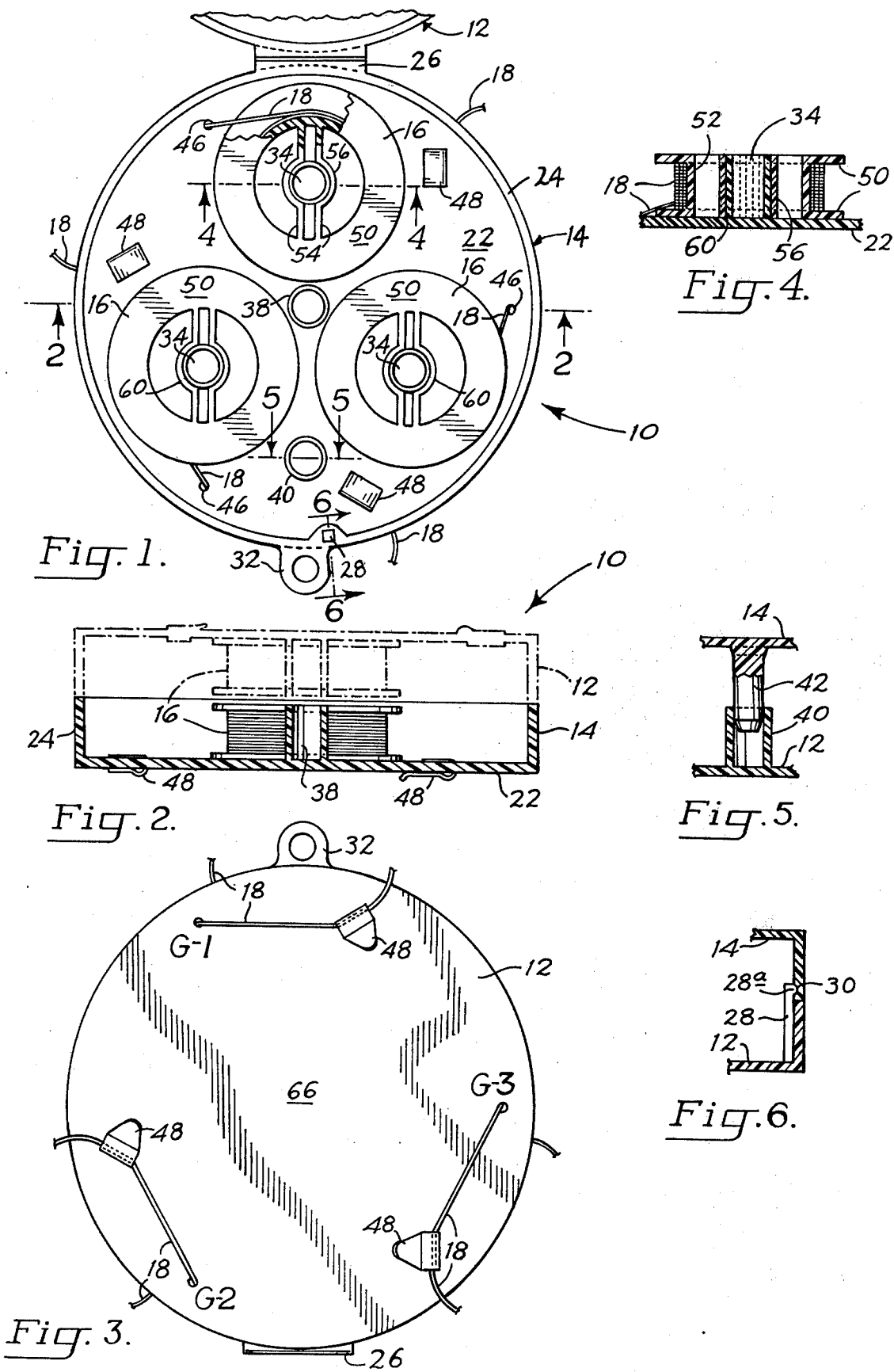

LEADER DISPENSER

BACKGROUND AND SUMMARY

The present invention relates to line dispensers, and in particular, to dispensers for dispensing plural leader lines.

In sport fishing, it is common to connect the bait or lure to the free end of the fishing line by a short length of leader. This leader is generally a monofilament which is supplied in a variety of thicknesses, generally ranging from 0.001 mm (1 lb. test) to 0.02 mm. (70 lb. test).

Oftentimes a sport fisherman will find it desirable to carry with him leaders of several different thicknesses. Preferably such leaders can be held in and dispensed from a single, compact dispenser. The present invention is designed to meet this need and provides the following advantages over prior art leader dispensers:

The dispenser is compact, capable of holding six leader spools in a pocket-sized case.

The leader line is dispensed from both sides of the dispenser case, minimizing tangling problems and making leader selection easier.

Each spool is held in frictional engagement within the dispenser, ensuring that the spools are unwound only when the leader is forcibly pulled from the dispenser.

It is thus an object of the present invention to provide a leader dispenser designed for dispensing leader from a plurality of wound spools.

More specifically, it is an object of the invention to provide a leader dispenser in which leader spools are arranged in two tiers, allowing the leader to be dispensed from opposite sides of the dispenser.

It is yet another object of the invention to provide such a leader dispenser in which the two tiers of spools are not separately partitioned from one another, thus simplifying dispenser construction and facilitating dispenser loading.

It is yet a further object of the invention to provide a leader dispenser which is simple and inexpensive in manufacture.

To this end, the present invention comprises separable top and bottom housing sections which form a dispenser enclosure. Each housing section is adapted to support three leader spools rotatably therein, these spools being mounted on posts symmetrically positioned within the housing sections. The mounting posts are dimensioned to frictionally engage the spools, preventing the spools from freely unwinding. The spools in the two housing sections form top and bottom tiers of spools with end faces of spools in the top tier facing end faces of the spools in the bottom tier. The free line end from each spool is fed through an associated opening in the dispenser case, providing access to the lines. A cutting tab adjacent each such opening is used both for securing the free end of the associated leader line and for cutting such leader line.

These and other objects and features of the present invention will now be more fully described with reference to the following detailed description of a preferred embodiment of the invention and the accompanying drawings.

DRAWINGS

FIG. 1 is a top plan view of the bottom housing section of the dispenser of the present invention, showing a portion of the hingeably-attached top housing section;

FIG. 2 is a cross sectional view of the line dispenser, taken generally along line 2—2 of FIG. 1;

FIG. 3 is a top plan view of the line dispenser;

FIG. 4 is a sectional view of a spool mounted on a mounting post, taken generally along line 4—4 of FIG. 1;

FIG. 5 is a sectional view of complimentary housing section guide members, taken generally along line 5—5 of FIG. 1; and FIG. 6 is a sectional view of dispenser locking means, taken generally along line 6—6 of FIG. 1.

DETAILED DESCRIPTION OF A PREFERRED EMBODIMENT OF THE INVENTION

Referring now to the figures, there is shown at 10 the leader dispenser of the present invention. The dispenser generally comprises top and bottom housing sections 12 and 14, which are separable to expose the interior of the two sections, as seen in FIG. 1. Rotatably mounted within each section are a plurality of spools 16 containing thereon windings of leader line 18.

Each housing section has a flat circular end wall 22 bounded by peripheral side wall 24. As best seen in FIG. 2, the two end walls of the dispenser occupy parallel planes, and the two peripheral side walls abut edge-to-edge, forming an enclosure. The two housing sections are hingeably attached along edge portions of their side walls by a hinge 26, and are fastenably attached by locking means located diametrical to hinge 26. As best seen in FIGS. 1 and 6, the locking means conventionally includes a semi-rigid fastener 28 extending above the edge of the bottom section side wall, and a recess 30 formed in the top section side wall for receiving therein fastener protuberance 28 a. A chain tab 32 attached to and projecting outwardly from the bottom section side wall may be used for fastening the dispenser to a chain or the like.

Each housing section provides plural spool mounting means for rotatably mounting spools 16 thereon. With reference to FIGS. 1 and 2, the spool mounting means includes an upright cylindrical post 34 attached to the inner face of the associated housing section end wall. Posts 34 are preferably positioned on a circle concentric with, and having a diameter approximately one-half of, side walls 24. Each housing section provides three mounting posts spaced apart at 120° intervals on this circle. As can be appreciated from FIG. 1, this configuration of mounting posts allows three spools 16, each having a diameter slightly less than the radius of the dispenser, to be held in coplaner fashion within each housing section, with the axis of rotation of the spools being normal to end walls 22.

Also shown in FIG. 1 is an upright cylindrical center post 38 dimensioned to extend vertically in proximity to the outer peripheral edges of spools 16. Post 38 in each housing section serves to limit lateral motion of the adjacent spools during leader dispensing.

Attached to the bottom section end wall is a hollow, cylindrical guide 40, and at a corresponding position on the top housing section end wall, a post 42. Post 42 is dimensioned to be slidingly received within guide 40, as shown in FIG. 5, thus to align the two housing sections as the dispenser is closed.

The above-described dispenser housing, including the substantially symmetrical housing sections 12 and 14, hinge 26, fastener 28, chain tab 32, posts 34, 38, and 42, and guide 40, is preferably formed from a single piece of molded plastic such as polyvinyl plastic.

The dispenser housing additionally provides access ports 46 adjacent each spool for threading the free end of leader line 18 through the dispenser housing. Conventional metal cutting tabs 48 secured to the housing section end walls serve both as clips in clamping the free ends of the leader line, and as cutting blades for cutting pieces of dispensed leader line.

Referring now to FIGS. 1 and 4, each spool 16 comprises a pair of opposed, parallel planar rings 50 connected at ring inner peripheral edges by an inner spool cylinder 52. Leader 18 is wound on the spool in the annular space between the spool cylinder and the outer peripheral edges of rings 50. The opposed outward faces of the planar rings, referred to herein as opposed end faces, are smooth-surfaced, permitting vertically contacting spools to rotate relative to one another in a substantially friction free manner.

A pair of flexible web members 54 are attached at their opposite ends to opposite sides of cylinder 52. Each of the web members provides a semicylindrical wall 56, the two walls 56 being opposed to form the sides of an enlargeable central aperture 60. Post 34 and aperture 60 are so dimensioned that the aperture fits snugly on the associated post with the sides of the aperture frictionally engaging said post. Explaining further, the spool web members are flexibly spread apart when a spool is placed on an associated post, whereby the web members exert a radially inward, frictional force against the post.

Describing now the use and operation of the present invention, the dispenser is loaded by unlocking the two housing sections to expose the interior of the two sections. Up to six spools, each supplying approximately 50 feet of leader line of a desired gauge, are placed on mounting posts 34, with the resiliently enlargeable spool apertures frictionally engaging the associated posts as described above. The frictional contact between spool and post prevents the spools from rotating freely within the dispenser container.

The free end of leader line from each spool is threaded through the associated access port 46 and clamped to the associated cutting tab 48, as shown in FIG. 3. Preferably the outer face 66 of each housing compartment has stamped thereon gauge numbers, indicated G-1-G-3, in FIG. 3, corresponding to leader thicknesses commonly employed in sport fishing. A spool of G-1 leader is so placed to access through the port labeled G-1, etc., allowing easy identification of the desired leader during dispenser use.

The spools in the top and bottom sections form two tiers of spool, with end faces of spools in the bottom section facing end faces of spools in the top housing section. As shown in FIG. 2, the outward end faces of spools 16 are in contact with adjacent housing section end walls, and the inward end faces of the spools are slightly spaced apart from the inward faces of vertically adjacent spools. It is foreseen that during normal use, vertically adjacent spools may shift on the posts, bringing their inward end faces into direct contact. Because the spool end faces are planar and smooth-surfaced, the vertically contacting spools may rotate, relative to one another, in a substantially friction free manner. And because rotational coupling between vertically adjacent, contacting spools is substantially less than the frictional engagement of each spool with its associated mounting post, a spool may be rotated in the act of unwinding leader therefrom, without imparting rotation to a vertically adjacent contacting spool. This feature allows the dispenser container to be constructed without provision for a separate partition between the two tiers of spools. In can be appreciated from the above that the two tiers of spools may be either vertically aligned, or offset such that a spool of one tier is vertically adjacent portions of two spools of the other tier.

A multiple-line leader dispenser which is simple, lightweight, compact, and easily loaded and used has been disclosed. Although the invention has been described with reference to a specific embodiment, it is understood that various modifications and changes may be made without departing from the true spirit of the invention.

It is claimed and desired to secure by Letters Patent:

1. A line dispenser comprising
    top and bottom housing sections which are separable to expose the interior of the housing sections,
    in each housing section, a plurality of spools having opposed end faces, and
    spool mounting means in each housing section rotatably mounting each of the spools in the housing section, a spool mounted on its spool mounting means being frictionally restricted from free rotation,
    said spools in said top and bottom sections forming two tiers of spools within the line dispenser and end faces of spools in the bottom housing section facing end faces of the spools in the top housing section.

2. The dispenser of claim 1, wherein a spool mounting means is an upright post and a spool has a resiliently enlargeable central aperture snugly receiving said post with sides of the aperture frictionally engaging said post.

3. The dispenser of claim 2 wherein a spool has a pair of opposed diametrically extending web members and each web member has a substantially semicylindrical wall being opposed and forming the sides of said central aperture.

4. The dispenser of claim 1 wherein said housing sections are substantially symmetrical halves of an enclosure, each said section having a substantially flat circular bottom bounded by a peripheral side wall, each said section being dimensioned to hold three said spools therein with the three associated mounting means being positioned on an inner circle having a diameter approximately one-half the diameter of said circular bottom, and spaced-apart on said inner circle at substantially 120° intervals.

5. The dispenser of claim 1 which further comprises an access port associated with each of said spools for passing line from an associated one of said spools therethrough and, for each said access port, a line cutting tab mounted externally on said dispenser.

6. A line dispenser comprising top and bottom, substantially symmetrical housing sections, which jointly define an enclosure, each section having a substantially flat end wall bounded by a peripheral side wall, said end walls occupying substantially parallel planes,
    a plurality of spools for holding windings of line or the like, each spool having opposed end faces,
    multiple spool mounting means in each housing section, each rotatably mounting a spool with the spool frictionally supported thereon, with the axis of rotation being normal to said end walls, said spools and said enclosure forming top and bottom tiers of spools with end faces of said spools in said top tier facing end faces of said spools and said bottom tiers.

7. In a line dispenser having a housing section and a substantially cylindrical mounting post therein, a spool comprising upper and lower planar rings supported in spaced apart, substantially parallel planes, and a pair of opposed, diametrically extending web members each web member having a substantially semi-cylindrical wall, said walls being opposed and forming the sides of a central enlargeable aperture, said aperture snugly receiving said post with the sides of said aperture frictionally engaging said post.

* * * * *